United States Patent
Inaba et al.

(10) Patent No.: US 9,627,718 B2
(45) Date of Patent: Apr. 18, 2017

(54) PARALLEL-CONNECTED ELECTRICITY STORAGE SYSTEM

(71) Applicant: Hitachi, Ltd., Tokyo (JP)

(72) Inventors: Ryoh Inaba, Tokyo (JP); Yutaka Kobayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 87 days.

(21) Appl. No.: 14/655,423

(22) PCT Filed: Feb. 25, 2013

(86) PCT No.: PCT/JP2013/054648
§ 371 (c)(1),
(2) Date: Jun. 25, 2015

(87) PCT Pub. No.: WO2014/128941
PCT Pub. Date: Aug. 28, 2014

(65) Prior Publication Data
US 2015/0364797 A1 Dec. 17, 2015

(51) Int. Cl.
*H02J 7/00* (2006.01)
*H01M 10/42* (2006.01)
*H01M 10/0525* (2010.01)

(52) U.S. Cl.
CPC ..... *H01M 10/425* (2013.01); *H01M 10/0525* (2013.01); *H02J 7/0024* (2013.01)

(58) Field of Classification Search
CPC .................................................. H02J 7/0024
(Continued)

(56) References Cited

U.S. PATENT DOCUMENTS 6,628,572 B1 * 9/2003 Yabe .................. G04C 10/00
320/128
6,838,923 B2 * 1/2005 Pearson ............ H01M 8/04888
327/309
(Continued)

FOREIGN PATENT DOCUMENTS

DE     10 2010 061 025 A1    6/2012
EP          2 670 018 A1    12/2013
(Continued)

OTHER PUBLICATIONS

The Extended European Search Report issued on Dec. 8, 2016 in the EP Application No. 13875557.4.

*Primary Examiner* — Yalkew Fantu
(74) *Attorney, Agent, or Firm* — Volpe and Koenig, P.C.

(57) ABSTRACT

A parallel-connected electricity storage system in which a plurality of chargeable and dischargeable electricity storage elements are connected in series as an electricity storage element row and a plurality of the electricity storage element rows are connected in parallel includes an electricity-storage-element-voltage measuring device that measures an electricity storage element voltage of each of the electricity storage elements, an electricity-storage-element-state estimating device that estimates an electricity storage element state of each of the electricity storage elements, an electricity-storage-element-current measuring device that measures an electricity storage element current of each of the electricity storage element rows, a parallel-connected switch that performs connection and disconnection to and from the parallel-connected electricity storage system for each of the electricity storage element rows, and a parallel-connected-switch control means for turning on the parallel-connected
(Continued)

switch on the basis of the electricity storage element voltage, the electricity storage element state, and the electricity storage element current.

4 Claims, 12 Drawing Sheets

(58) Field of Classification Search
USPC .......................................................... 320/126
See application file for complete search history.

(56) References Cited

U.S. PATENT DOCUMENTS

| | | | |
|---|---|---|---|
| 9,184,476 B2* | 11/2015 | Suzuki | H01M 10/482 |
| 2008/0191662 A1* | 8/2008 | Nakanishi | H02J 7/0016 |
| | | | 320/118 |
| 2009/0066291 A1* | 3/2009 | Tien | H02J 7/0016 |
| | | | 320/118 |
| 2009/0243540 A1* | 10/2009 | Choi | H02J 7/0016 |
| | | | 320/107 |
| 2013/0300192 A1 | 11/2013 | Inaba et al. | |
| 2014/0103859 A1 | 4/2014 | Nishi | |

FOREIGN PATENT DOCUMENTS

| | | |
|---|---|---|
| JP | 2009-033936 A | 2/2009 |
| JP | 2009-212020 A | 9/2009 |
| JP | 2010-029015 A | 2/2010 |
| WO | 2012101771 A1 | 8/2012 |
| WO | 2012-164630 A1 | 12/2012 |

* cited by examiner

PARALLEL-CONNECTED ELECTRICITY STORAGE SYSTEM

TECHNICAL FIELD

The present invention relates to a parallel-connected electricity storage system.

BACKGROUND ART

When single electricity storage elements are increased in capacity and connected in series in order to realize an increase in the capacity of a electricity storage system, there is a problem in that temperature variation occurs in the series electricity storage elements and power supply to an apparatus connected to the electricity storage system is interrupted when at least one of the electricity storage elements is broken down. Therefore, small-capacity electricity storage elements equivalent to the number of necessary voltage stages are connected in series and a plurality of the electricity storage element rows are connected in parallel. When a part of the electricity storage elements are broken down, only the electricity storage element row to which the broken-down electricity storage elements belong is disconnected to avoid the interruption of the power supply to the apparatus connected to the electricity storage system. By replacing only the broken-down electricity storage element row, it is possible to reduce life cycle costs of the electricity storage system.

However, if a large number of electricity storage elements are connected in series and in parallel and used, because of variation during manufacturing of the electricity storage elements and a difference in an environment of use (e.g., an ambient temperature), an internal short-circuit sometimes occurs only in a part of the electricity storage elements. Consequently, an electric current equal to or larger than an allowable current flows to a part of the electricity storage elements and the electricity storage elements abnormally generate heat and are easily broken down. Therefore, it is anticipated that the electricity storage element row to which the broken-down electricity storage elements belong is disconnected (paralleled off) from the parallel-connected electricity storage system using a switch and replaced with other electricity storage elements. However, in the case of an electricity storage system for the purpose of suppressing power fluctuation, it is necessary to replace electricity storage elements without stopping charging and discharging. Therefore, it is necessary to reconnect (parallel on) the electricity storage element row after the replacement in a state in which the parallel-connected electricity storage system is performing the charging and discharging. However, when paralleling on the electricity storage element row, if there is a voltage difference between the parallel-connected electricity storage system and the electricity storage element row after the replacement, an electric current equal to or larger than the allowable current sometimes flows to a part of the electricity storage elements.

For example, Patent Literature 1 proposes an electricity storage system that switches on only an electricity storage element row having a predetermined voltage difference.

CITATION LIST

Patent Literature

Patent Literature 1: JP-A-2009-33936

SUMMARY OF INVENTION

Technical Problem

However, in the technique disclosed in Patent Literature 1 as well, it is likely that variation in an electric current occurs among the electricity storage element rows and an excessively large current flows to a part of the rows.

For example, a case is examined in which the electricity storage element rows are switched on when battery remaining powers of the electricity storage element rows are equal. The manner of the flow of an electric current at this point is shown in FIG. 10. When it is assumed that all power deterioration states in the electricity storage element rows are equal, if battery remaining powers are equal, battery open-circuit voltages are equal. However, among the electricity storage element rows already switched on and the electricity storage element rows not switched on yet, there is a voltage difference due to wiring resistance caused by a bus bar or the like for connecting batteries in series and in parallel. Therefore, if the electricity storage element rows are switched on when the battery remaining powers are equal (T=T0), there is a problem in that a large current flows to the switched-on electricity storage element rows.

Next, a case is examined in which both end voltages of a parallel-connected switch 101 are equal. The manner of the flow of an electric current at this point is shown in FIG. 11. In this case, immediately after switch-on (T=T1), a voltage difference is substantially zero between the parallel-connected electricity storage system and the electricity storage element row after the replacement. Therefore, an electric current hardly flows from the electricity storage element row after the replacement and gradually starts to flow in a relaxation time $\tau$. However, when sudden fluctuation (T=T1') of charging and discharging currents of the entire parallel-connected electricity storage system occurs while such large current variation occurs in among the electricity storage element rows in the parallel-connected electricity storage system, there is a problem in that an excessively large current flows to the electricity storage element row after the replacement.

It is an object of the present invention to prevent an excessively large current from flowing to a part of electricity storage elements when apart of electricity storage battery rows in a parallel-connected electricity storage system are paralleled on after being paralleled off.

Solution to Problem

In order to attain the object, the present invention provides a parallel-connected electricity storage system in which a plurality of chargeable and dischargeable electricity storage elements are connected in series as an electricity storage element row and a plurality of the electricity storage element rows are connected in parallel, the parallel-connected electricity storage system including: an electricity storage-element-voltage measuring device that measures an electricity storage element voltage of each of the electricity storage elements; a electricity storage-element-state estimating device that estimates an electricity storage element state of each of the electricity storage elements; a electricity storage-element-current measuring device that measures an electricity storage element current of each of the electricity storage element rows; a parallel-connected switch that performs connection and disconnection to and from the parallel-connected electricity storage system for each of the electricity storage element rows; and a parallel-connectedswitch control means for turning on the parallel-connected switch on the basis of the electricity storage element voltage, the electricity storage element state, and the electricity storage element current.

Advantageous Effect of Invention

According to the present invention, it is possible to prevent an excessively large current from flowing to a part of the electricity storage elements when a part of the electricity storage battery rows in the parallel-connected electricity storage system are paralleled on after being paralleled off.

DESCRIPTION OF EMBODIMENTS

An embodiment of a parallel-connected electricity storage system of the present invention is explained in detail below with reference to the drawings.

Figure 12:
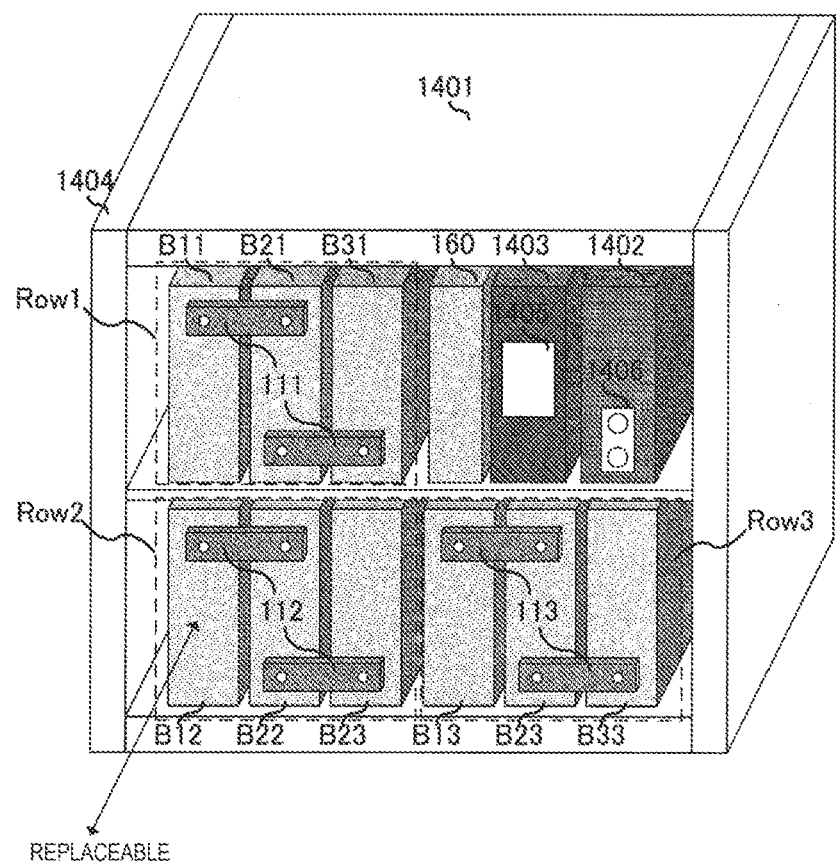
FIG. 12 is a schematic diagram for explaining the overall configuration of a parallel-connected electricity storage system.

First, the configuration of a parallel-connected electricity storage system 1401 is explained with reference to FIG. 12.

The parallel-connected electricity storage system 1401 includes a plurality of electricity storage elements 311 to 333, bus bars 111 to 113 for connecting the electricity storage elements B11 to B33 in series, electricity storage element rows Row1 to Row3 formed by connecting a plurality of electricity storage elements in series, a parallel-connected-switch control device 160 for controlling a switch for connecting the electricity storage elements in parallel, a parallel-connected-electricity-storage-system integrated control controller 1403 for controlling the entire parallel-connected electricity storage system 1401, a power converting device 1402 that performs conversion of a direct current and an alternating current, a connection terminal 1406 for connection to an external charging power supply and a load, a state display monitor 1405 that displays states of the electricity storage elements and the parallel-connected electricity storage system, and a rack 1404 for housing the devices and the electricity storage elements.

The electricity storage elements B11 to B33 only have to be chargeable and dischargeable secondary batteries. For example, a nickel hydrogen battery, a lithium ion battery, a lead storage battery, and a lithium ion capacitor are conceivable.

The converting device 1402 is configured by a converter, an inverter, and the like. The power converting device 1402 is capable of discharging, as direct-current power, electric energy accumulated in the electricity storage elements B11 to B33, converting the discharged direct-current power into alternating-current power, and outputting the alternating-current power to an alternating-current power supply system side connected to the connection terminal 1406 and receiving an input of alternating-current power supplied from the alternating-current power supply system side or a power generating system and converting the input alternating-current power into direct-current power.

Figure 1:
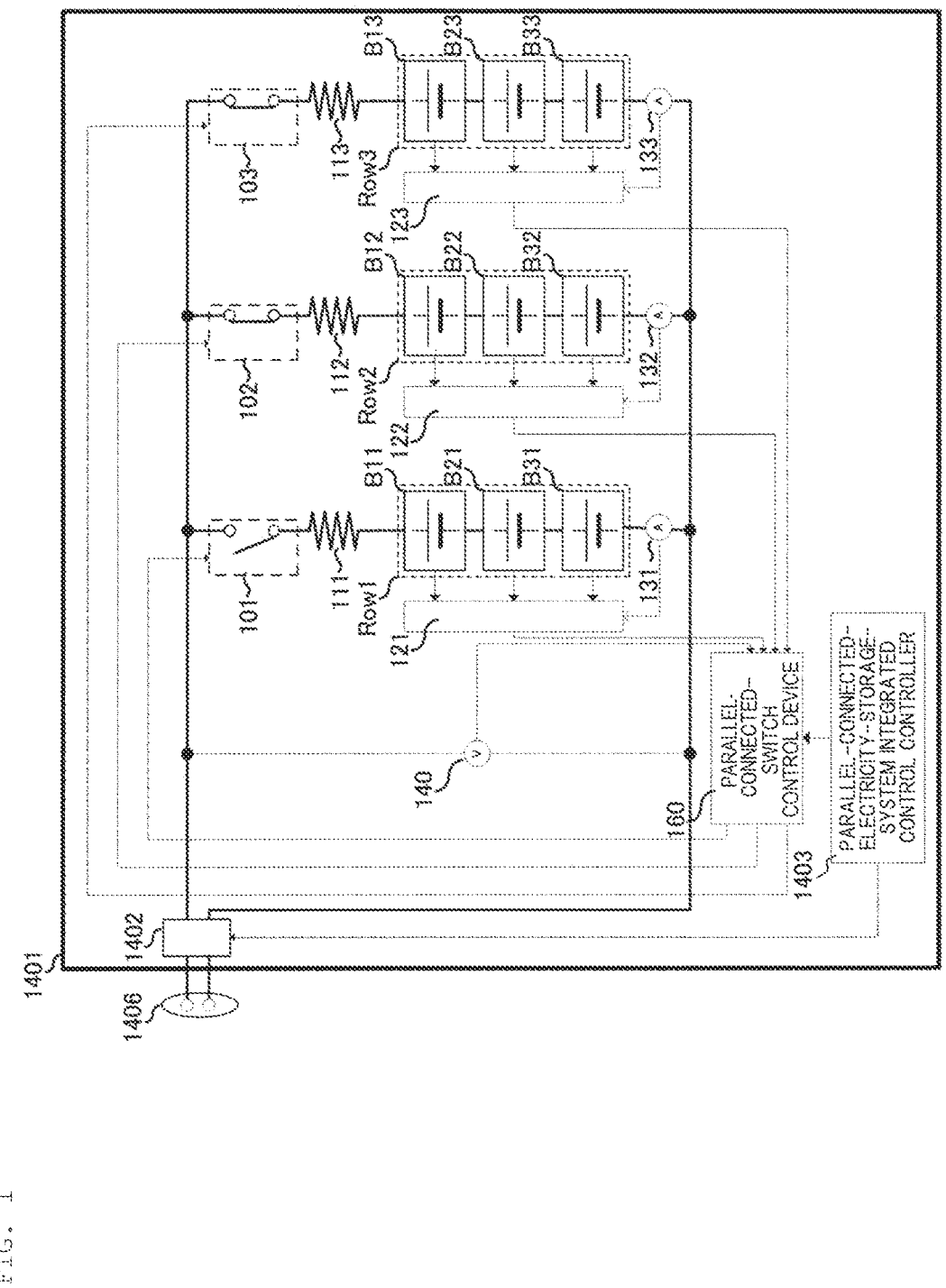
FIG. 1 is a circuit diagram showing the overall configuration of a parallel-connected electricity storage system.

Next, the structure of the inside of the parallel-connected electricity storage system 1401 is explained with reference to FIG. 1.

The parallel-connected electricity storage system 1401 includes an electricity storage element row Row1 configured by connecting a plurality of (in this embodiment, three) electricity storage elements B11, B21, and B31 in series and a electricity storage element row Row2 and a electricity storage element row Row3 having configurations same as the configuration of the electricity storage element row Row1. Parallel-connected switches 101 to 103 are respectively connected to the electricity storage element rows Row1, Row2, and Row3 in series. In configuring the electricity storage element rows, there are wiring resistance values 111 to 113 for each of the electricity storage element rows obtained by aggregating resistance values caused by bus bars for connecting the electricity storage elements to one another, a shunt resistor for current detection explained below, and the like.

Electricity-storage-element-row-state detecting devices 121, 122, and 123 that can detect and estimate an electricity storage element voltage, internal resistance, an electricity storage element temperature, an electricity storage element remaining power, and the like of each of the electricity storage elements present in the respective electricity storage element rows are connected to the electricity storage element rows Row1, Row2, and Row3. Signals of the electricity-storage-element-row-state detecting devices 121, 122, and 123 are transmitted to the parallel-connected-switch control device 160. There are current detecting devices 131, 132, and 133 that can detect electric currents output by (or flowing into) the electricity storage element rows. Values of the electric currents are transmitted to the electricity-storage-element-row-state detecting devices 121, 122, and 123. There is a voltage detecting device 140 that can detect the voltage of the entire parallel-connected electricity storage system. Detection values of the detecting devices are transmitted to the parallel-connected-switch control device 160. As the parallel-connected switches 101 to 103, a mechanical relay, a semiconductor switch, and the like can be used.

As the current detecting devices, a form of using a hall element or a shunt resistor is generally used.

The parallel-connected-switch control device 160 performs control of the parallel-connected switches 101 to 103 on the basis of an open-circuit voltage and internal resistance of each of the electricity storage elements, current values of the electricity storage element rows, and the number of electricity storage element rows connected to the parallel-connected electricity storage system.

The devices provided for each of the electricity storage element rows are explained below. As an example, the devices concerning the electricity storage element row Row1 are described.

Figure 2:
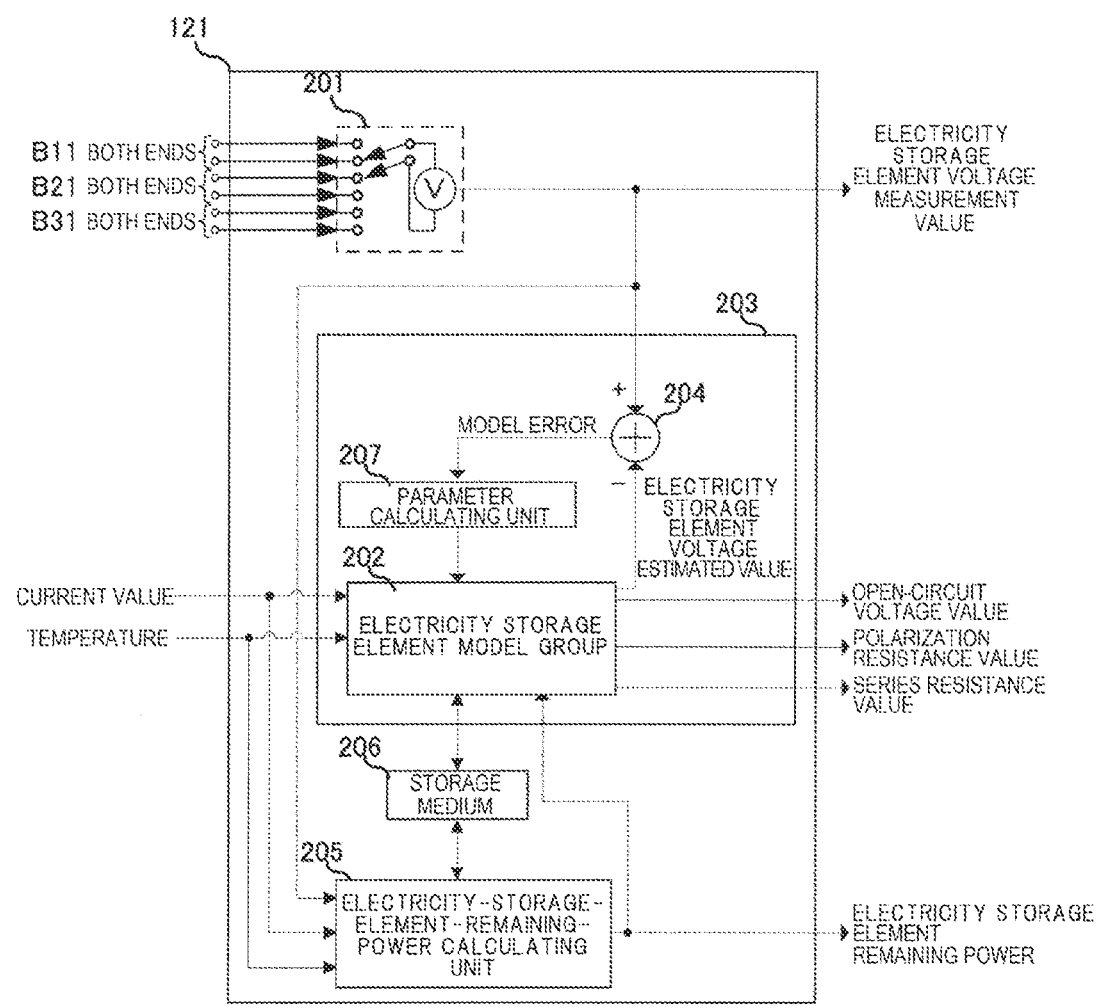
FIG. 2 is a circuit diagram showing the configuration of an electricity-storage-element-row-state detecting device.

Next, the structure of the inside of the electricity-storage-element-row-state detecting device 121 is explained with reference to FIG. 2.

The electricity-storage-element-row-state detecting device 121 includes an electricity-storage-element-both-end-voltage measuring device 201 that can measure both end voltages of the electricity storage elements B11, B21, and B31, an electricity-storage-element-internal-state estimating unit 203 that estimates internal states of the electricity storage elements B11, B21, and B31, an electricity-storage-element-remaining-power calculating unit 205 that calculates an electricity storage element remaining power, and a storage medium 206 in which electricity storage element states and the like are recorded.

A method is conceivable in which the electricity-storage-element-both-end-voltage measuring device 201 measures both end voltages of the electricity storage elements using one voltmeter and a multiplexer.

The electricity-storage-element-internal-state estimating unit 203 includes, on the inside, an electricity storage element model group 202 respectively modeled using equivalent circuits of the electricity storage elements B11, B21, and B31, a model-error calculating unit 204 that compares electricity storage element voltages and electricity storage element voltage estimated values estimated by the electricity storage element model group 202 and calculates a model error of the electricity storage element models, and a parameter calculating unit 207 that calculates parameter values of the electricity storage element models on the basis of the model error. The electricity-storage-element-internal-state estimating unit 203 outputs open-circuit voltage values, polarization resistance values, and series resistance values of the electricity storage element models.

The electricity-storage-element-remaining-power calculating unit 205 calculates remaining power of the electricity storage element on the basis of an electricity storage element voltage, a current value flowing to the electricity storage element, and an electricity storage element temperature. As a calculation method, a coulomb count method for calculating charges by time-integrating a flowing current value, a method of calculating remaining power using a relation between a electricity storage element voltage and electricity storage element remaining power recorded in the storage medium 206, a combined method of these methods, and the like are conceivable.

Figure 3:
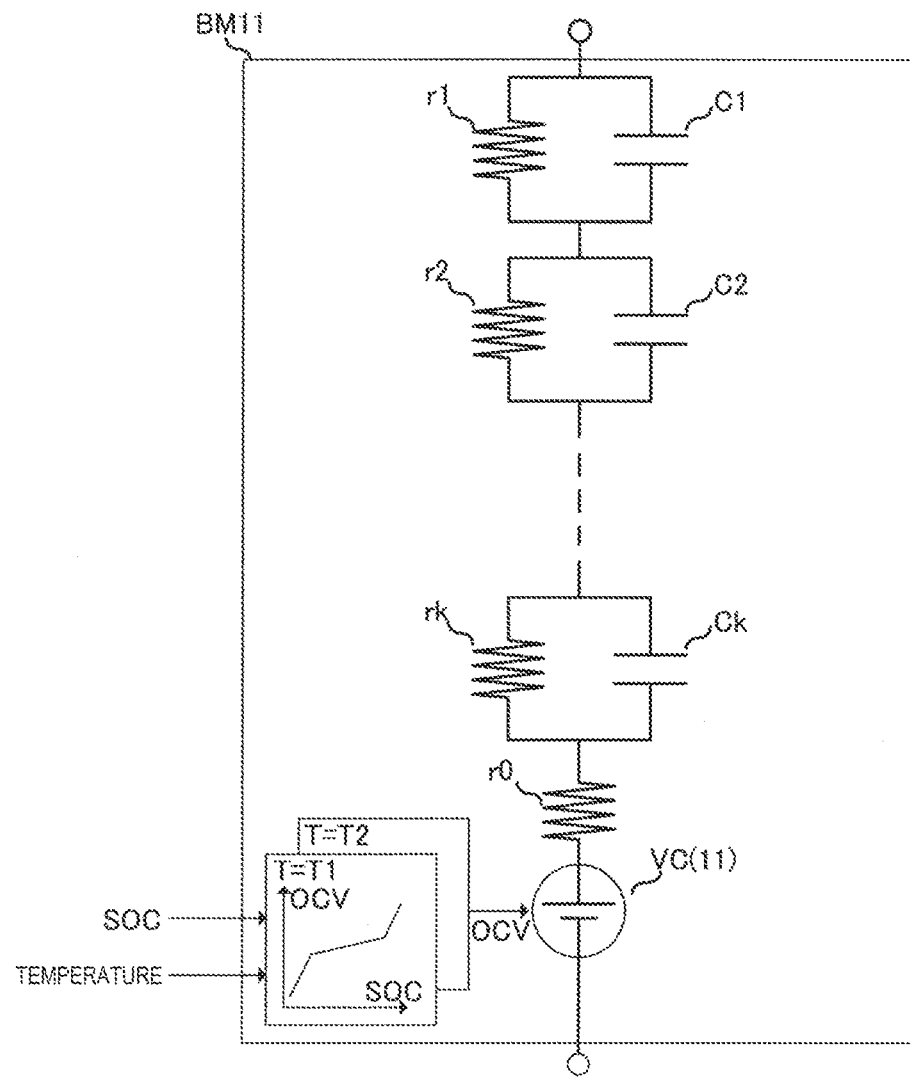
FIG. 3 is a schematic diagram concerning modeling of electricity storage elements.

Next, the electricity storage element model group 202 included in the inside of the electricity-storage-element-internal-state estimating unit 203 is explained with reference to FIG. 3. An equivalent circuit model of the electricity storage elements B11 to B13 is included in the electricity storage element model group 202. As a electricity storage element equivalent circuit model BM11 in use, an electricity storage element equivalent circuit model is used in which one resistor r0, k (k is an integer equal to or larger than 1) RC parallel circuits, and an open-circuit voltage source VC (11) that outputs a battery open-circuit voltage (OCV) calculated from electricity storage element remaining power (SOC) and a battery temperature are connected in series. In the following explanation, r0 represents a series resistance parameter and r1 to rk represent polarization resistance parameters.

As an example, in a general lithium ion battery used as an electricity storage element, if k=1, when a battery capacity is about 1 Ah, parameter values of the equivalent circuit model are r0=about 30 [mΩ], r1=about 30 [mΩ], c1=about 1000 [F], and VC=about 2.5 to 4.2 [V]. However, these values are different depending on a type of the electricity storage element and materials of electrodes and an electrolytic solution in use. Therefore, it is desirable to identify parameter values and write the parameter values in the storage medium 206 before the electricity storage element is used in the parallel-connected electricity storage system. However, since the parameter values also change according to a state of use of a battery. Therefore, it is necessary to update the parameter values while the electricity storage element is used in the parallel-connected electricity storage system.

Figure 4:
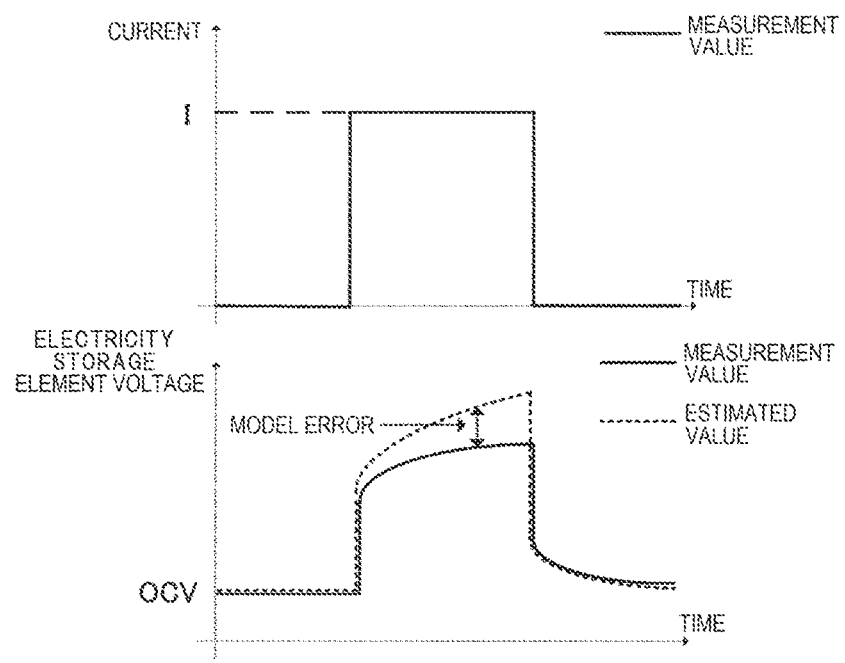
FIG. 4 is a schematic diagram concerning a parameter identification method of an electricity storage element model.

Next, updating means for the model parameter values of the electricity storage element equivalent circuit model BM11 is explained with reference to FIG. 2 and FIG. 4. A current value actually flowing to the electricity storage element row Row1 is input to the electricity storage element equivalent circuit model BM11 created as shown in FIG. 3. An electricity storage element voltage estimated value calculated at that point and an electricity storage element voltage measurement value measured by the electricity-storage-element-both-end-voltage measuring device 201 are compared by the model-error calculating unit 204. An example of the comparison is shown in FIG. 4. If a rectangular wave-like current shown in FIG. 4 is input as the input current, the electricity storage element voltage shows behavior shown in FIG. 4. Deviation between the electricity storage element voltage estimated value and the electricity storage element voltage measurement value is represented as a model error. A value of the model error is transmitted to the parameter calculating unit 207. The parameter calculating unit 207 calculates model parameter values (r0 to rk and c1 to ck) to minimize the model error and updates the parameters of the electricity storage element model according to a result of the calculation. As a method of minimizing the model error in the parameter calculating unit 207, it is conceivable to, for example, fit the electricity storage element voltage measurement value according to a method of minimum squares.

Next, the operation during replacement of the electricity storage element B11 of the parallel-connected electricity storage system is explained with reference to control flowcharts of FIG. 7 and FIG. 8.

Figure 7:
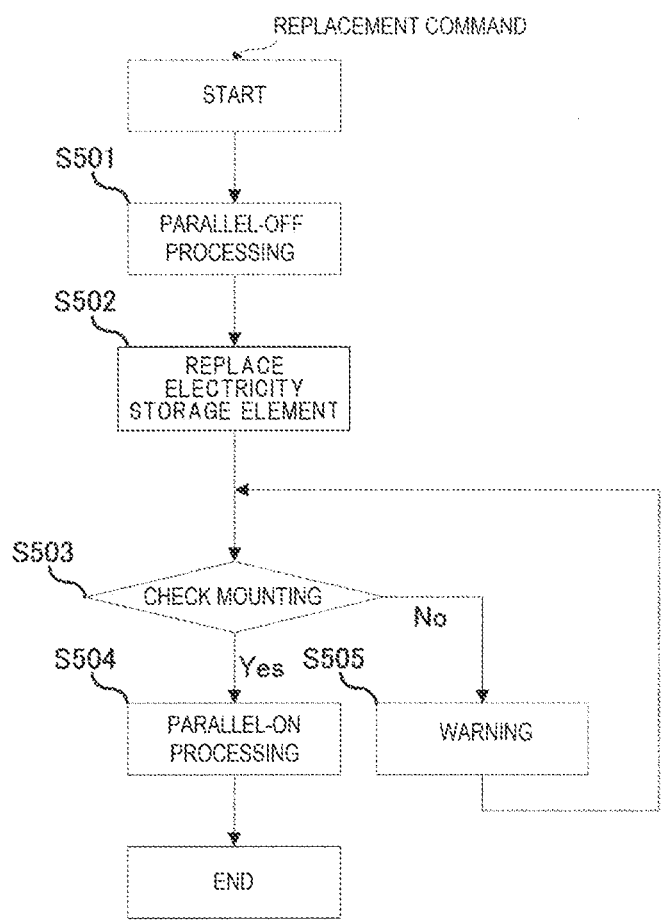
FIG. 7 is a flowchart for explaining the operation of a parallel-connected electricity storage system according to an embodiment.
Figure 8:
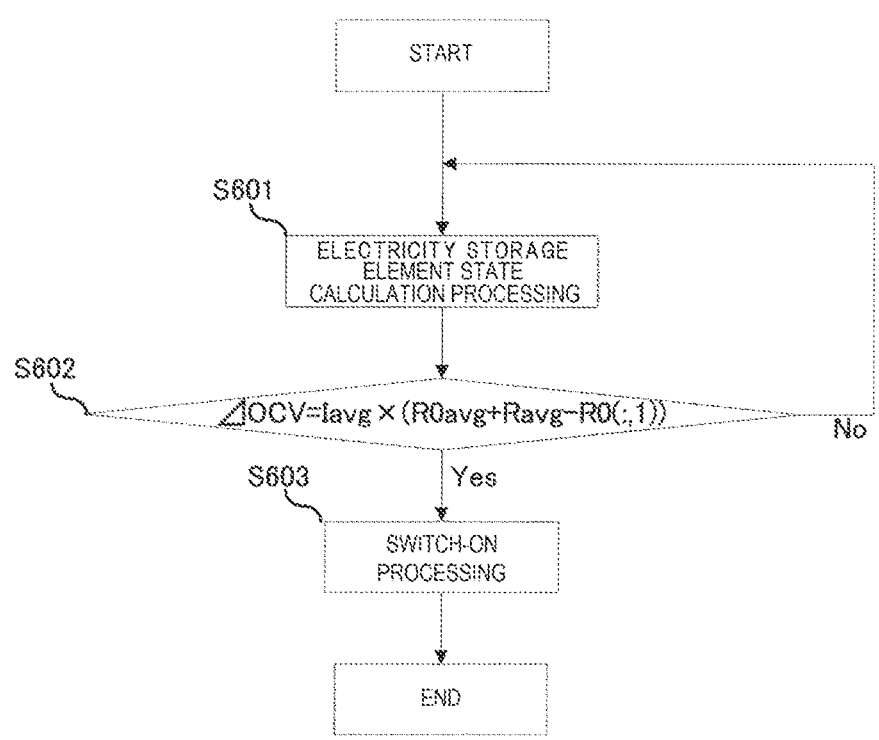
FIG. 8 is a flowchart for explaining the operation of parallel-on processing according to the embodiment.

When a command for electricity storage element replacement processing is transmitted to the parallel-connected-switch control device from the parallel-connected-electricity-storage-system integrated control controller 1403, the parallel-connected electricity storage system is controlled according to the flowchart of FIG. 7.

At a stage of parallel-off processing in S501, an electricity storage element row including an electricity storage element for which a replacement command is issued from the parallel-connected-electricity-storage-system integrated control controller 1403 is disconnected using the parallel-connected switch. In this embodiment, a case is examined in which the electricity storage element row Row1 is replaced. The parallel-connected switch 101 is turned off in order to disconnect the electricity storage element row Row1.

Next, at a stage of electricity storage element replacement in S502, the electricity storage element row Row1 is replaced. Concerning a method of the replacement, for example, a method of replacing the electricity storage element row Row1 with an electricity storage element row disposed as a spare in the parallel-connected electricity storage system and a method of manually detaching the electricity storage element row and attaching a new electricity storage element row are conceivable.

Next, at a stage of mounting check in S503, it is checked whether the electricity storage element row can be correctly mounted. As a method of the check, for example, a mechanism is conceivable in which a switch is turned on when the electricity storage element row is inserted into the rack 1404 of the parallel-connected electricity storage system and a signal of the switch-on is transmitted to the parallel-connected-switch control device. Consequently, it is possible to prevent an excessively large current due to the switch-on in a wrong state from flowing to a part of the electricity storage element rows.

If the electricity storage element row is not correctly mounted, the processing proceeds to a stage of warning in S505. At the stage of the warning in S505, amounting error is displayed on the state display monitor 1405 to urge a mounting check.

If the electricity storage element row is correctly mounted on the rack, the processing proceeds to S504, parallel-on processing for the electricity storage element row is performed. The electricity storage element replacement processing ends.

Next, a stage of connection processing in S504 is explained with reference to FIG. 8.

Figure 6:
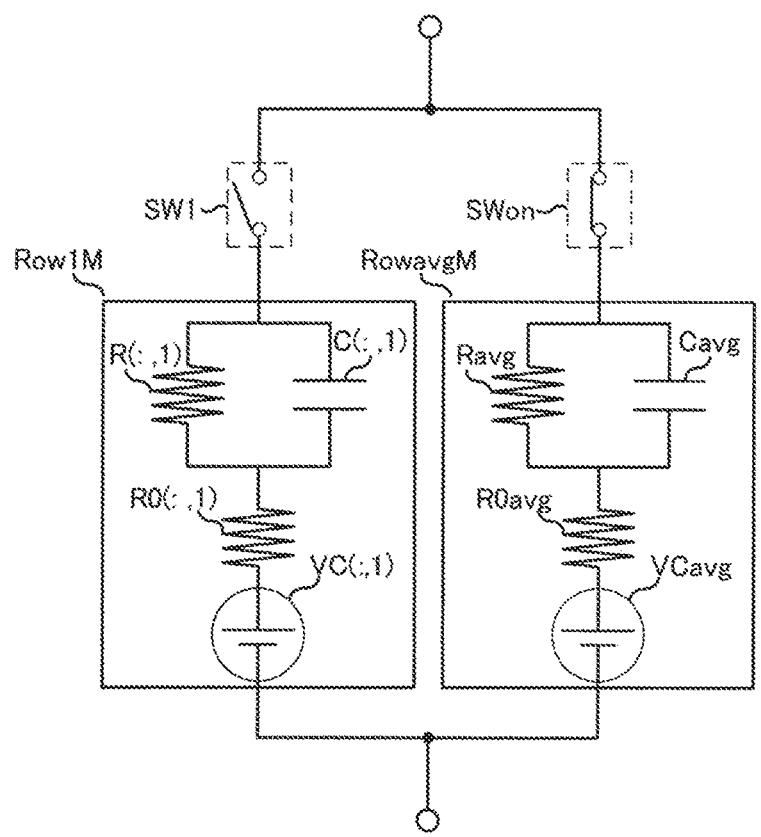
FIG. 6 is a schematic diagram concerning modeling of an electricity storage system.

At a stage of electricity-storage-element-state calculation processing in S601, electricity storage element states of the electricity storage elements are calculated and parameter values shown in FIG. 6 are calculated.

In S602, it is determined whether a condition (Expression 1) that an electric current substantially equally flows to the electricity storage element rows at an instance of parallel-on is satisfied.

$$\Delta OCV = OCV(:,1) - OCVavg = Iavg \times (R0avg + Ravg - R0(:,1)) \quad \text{(Expression 1)}$$

ΔOCV represents an open-circuit voltage difference of paralleled-off electricity storage element rows. Iavg represents a current average of the electricity storage element rows after the switch is turned on. When (Expression 1) is satisfied, the processing proceeds to switch processing in S603. If (Expression 1) is not satisfied, the processing proceeds to S601. In the switch processing in S603, the parallel-connected-switch control device performs processing for turning on the parallel-connected switch 101. The parallel-on processing S504 ends.

Figure 5:
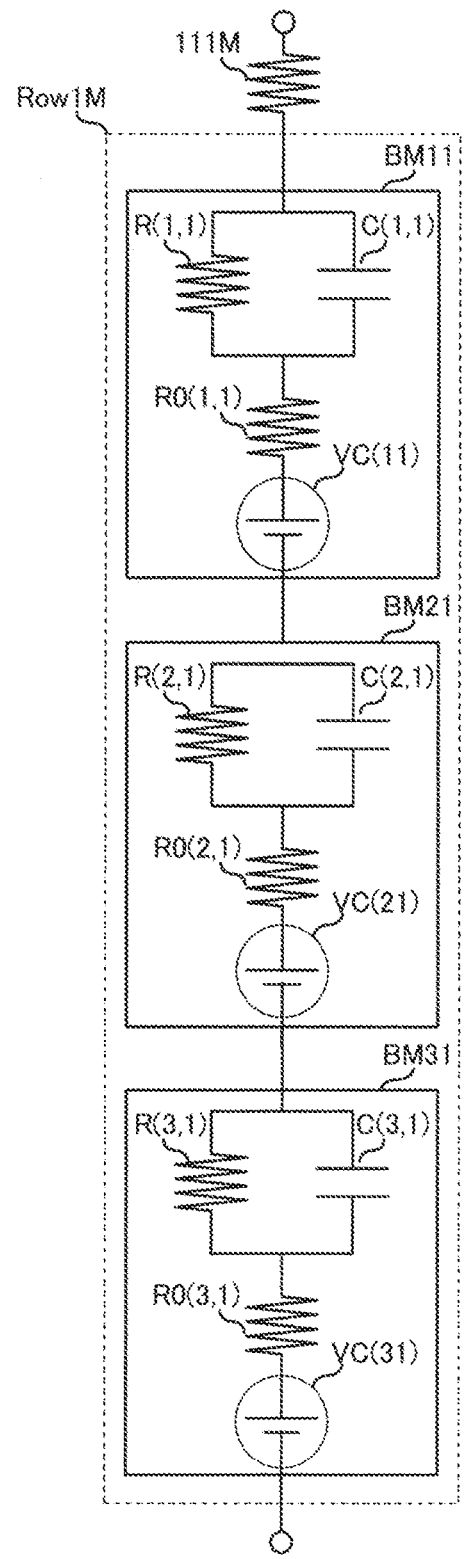
FIG. 5 is a schematic diagram concerning modeling of an electricity storage element row.

Next, a deriving method of (Expression 1) is explained with reference to FIG. 5 and FIG. 6. First, a method of modeling the electricity storage element rows Row1 to Row3 using models of the electricity storage elements configuring the electricity storage element rows Row1 to Row3 is explained with reference to FIG. 5.

A electricity storage element row model RowM1 obtained by modeling the electricity storage element row Row1 is configured by connecting, in series, the electricity storage element equivalent circuit models BM11, BM21, and BM 31 and a wiring resistance model 111M having a resistance value equivalent to the resistance value of the bus bar 111. However, the polarization resistance parameters r1 to rk and the polarization capacitance parameters c1 to ck of the electricity storage element equivalent circuit model BM11 are replaced with one polarization resistance $R(1,1) = r1 + r2 + \ldots + rk$ and one polarization capacitance $1/C(1,1) = 1/c1 + 1/c2 + \ldots + 1/ck$. The same replacement is performed concerning the other electricity storage elements B21 and B31. The same modeling is performed concerning the electricity storage element rows Row2 and Row3 to create electricity storage element row models RowM2 and RowM3.

Next, a method of modeling the parallel-connected electricity storage system using modeled electricity storage element row models Row1M, Row2M, and Row3M is explained with reference to FIG. 6.

Concerning the electricity storage element row model Row1M of the paralleled-off electricity storage element rows, paralleled-off electricity storage element row series resistance $R0(:,1) = R0(1,1) + R0(2,1) + R0(3,1) + 111M$, paralleled-off electricity storage element polarization resistance $R(:,1) = R(1,1) + R(2,1) + R(3,1)$, paralleled-off electricity storage element row polarization capacitance $1/C(:,1) = 1/C(1,1) + 1/C(2,1) + 1/C(3,1)$, and paralleled-off electricity storage element row open-circuit voltage $VC(:,1) = VC(11) + VC(21) + VC(31)$ are defined and modeled.

Concerning the electricity storage element row models of the electricity storage element rows Row2 and Row3 connected to the system, similarly, the electricity storage element rows Row2M and Row3M are created. Next, a connected electricity storage element row model RowavgM is defined and modeled using values described below.

Connected electricity storage element row series resistance $R0avg = (R0(:,2) + R0(:,3))/2$ Connected electricity storage element row polarization resistance $Ravg = (R(:,2) + R(:,3))/2$ Connected electricity storage element row polarization capacitance $Cavg = (C(:,2) + C(:,3))/2$ Connected electricity storage element row open-circuit voltage $VCavg = (VC(:,2) + VC(:,3))/2$ Next, when an electric current flowing to the electricity storage element row model Row1M and the connected electricity storage element row model RowavgM at an instance of parallel-on are examined, the electric current is considered to hardly flow to R(:,1) at the instance of the parallel-on. When an electric current flowing to Row1M is represented as I' and an electric current flowing to RowavgM is represented as I'' (both of I' and I'' are positive during charging and are negative during discharging), an expression described below holds from a condition that voltages of the electricity storage element rows after the parallel-on are equal.

$$VC(:,1) + I' \times R0(:,1) = VCavg + I'' \times (R0avg + Ravg) \quad \text{(Expression 2)}$$

In (Expression 2), it is assumed that an equal electric current flows to the electricity storage element rows at the instance of the parallel-on, and, if I'=I''=Iavg(n)=I/n is set and arranged, (Expression 1) is obtained.

Figure 9:
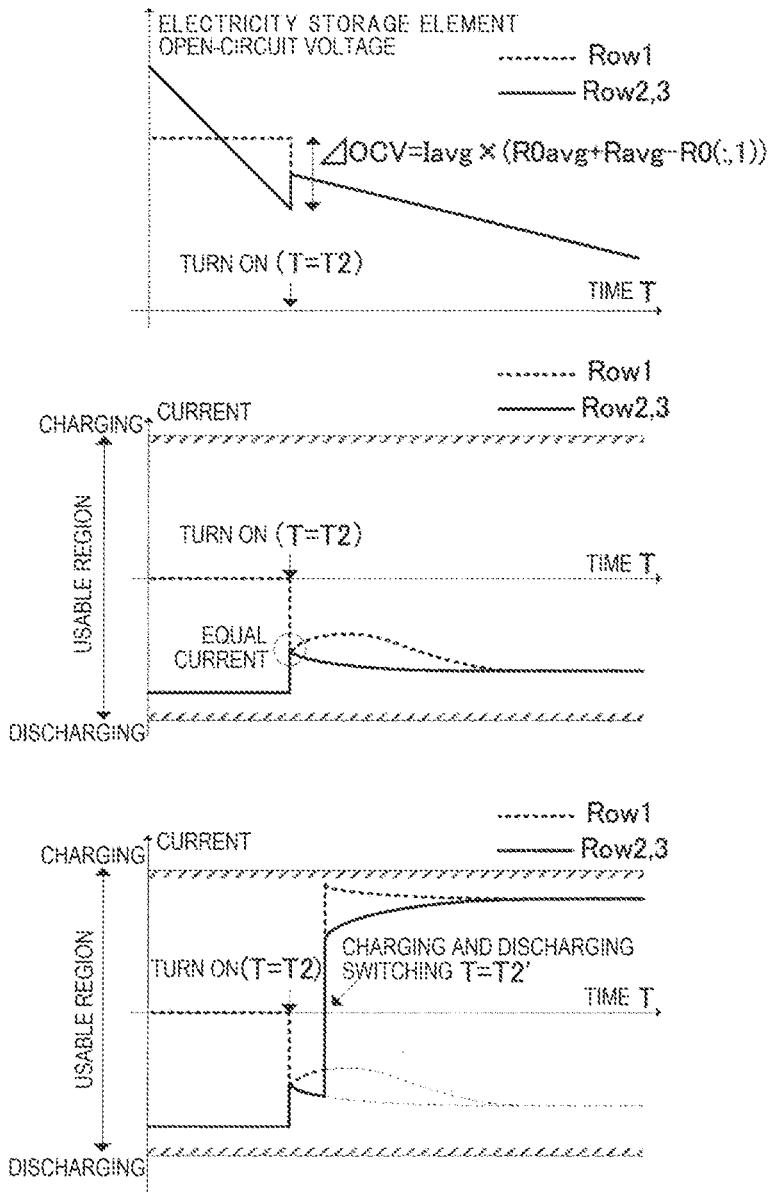
FIG. 9 is a schematic diagram concerning current distributions before and after the parallel-on processing according to the embodiment.
Figure 10:
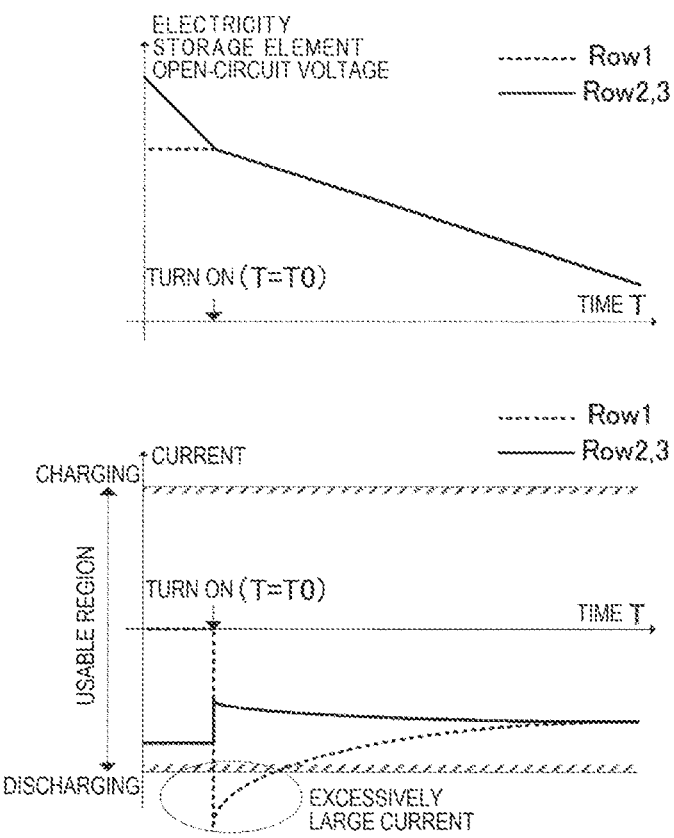
FIG. 10 is a schematic diagram concerning current distributions before and after connection processing in a conventional example 1.
Figure 11:
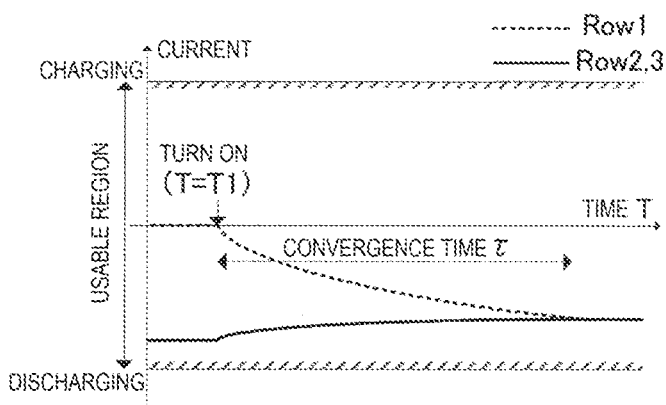
FIG. 11 is a schematic diagram concerning current distributions before and after connection processing in a conventional example 2.
Figure 11:
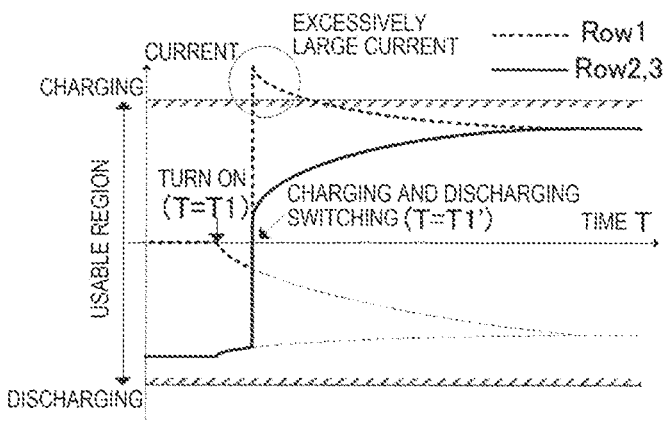

Next, examples of a change in open-circuit voltages of the electricity storage element rows in the case in which the electricity storage element rows are paralleled-on 5 according to this embodiment, a change in an electric current at that point, and a change in an electric current in the case in which charging and discharging switching after the parallel-on is performed are shown in FIG. 9. If Row1 is paralleled-on during the discharging of Row2 and 10 Row3, when the switch is turned on under a condition that electricity storage element row open-circuit voltages of Row1 and Row2 and Row3 satisfy (Expression 1) (T=T2), substantially equal electric currents flow to the electricity storage element rows.

If switching from the 15 discharging to the charging occurs at T=T2', since current variation is small, an excessively large current does not flow in the electricity storage element rows.

REFERENCE SIGNS LIST

1401 Parallel-connected electricity storage system
1402 Power converting device
1403 Parallel-connected-electricity-storage-system integrated control controller
1404 Rack
1405 State display monitor
1406 Connection terminal
101, 102, 103 Parallel-connected switches
111, 112, 113 Wiring resistors (bus bars)
B11 to B33 Electricity storage elements
Row1, Row2, Row3 Electricity storage element rows
121, 122, 123 Electricity-storage-element-row-state detecting devices
131, 132, 133 Current detecting devices
140 Voltage detecting device
160 Parallel-connected-switch control device
201 Electricity-storage-element-both-end-voltage measuring device
202 Electricity storage element model
203 Electricity-storage-element-internal-state estimating unit
204 Model-error calculating unit
205 Electricity-storage-element-remaining-power calculating unit
206 Storage medium
207 Parameter calculating unit
r0 Series resistance parameter
r1 . . . rk Polarization resistance parameters
c1 . . . ck Polarization capacitance parameters
VC(11) . . . VC(33) Open-circuit voltage sources
BM11 . . . BM33 Electricity storage element models
111M . . . 113M Wiring resistance models
Row1M . . . Row3M Electricity storage element row models
R(1,1) . . . R(3,3) Polarization resistances
R0(1,1) . . . R0(3,3) Series resistances
C(1,1) . . . C(3,3) Polarization capacitances
SW1 Paralleled-off electricity storage element row switch
SWon Connected electricity storage element row switch
R(:,1) . . . R(:,3) Paralleled-off electricity storage element row polarization resistances
R0(:,1) . . . R0(:,3) Paralleled-off electricity storage element row series resistances
C(:,1) . . . C(:,3) Paralleled-off electricity storage element row polarization capacitances
VC(:,1) . . . VC(:,3) Paralleled-off electricity storage element row open-circuit voltages
RowavgM Connected electricity storage element row model
Ravg Connected electricity storage element row polarization resistance
R0avg Connected electricity storage element row series resistance
Cavg Connected electricity storage element row polarization capacitance
VCavg Connected electricity storage element row open-circuit voltage

The invention claimed is:

1. A parallel-connected electricity storage system in which a plurality of chargeable and dischargeable electricity storage elements are connected in series as an electricity storage element row and a plurality of the electricity storage element rows are connected in parallel, the parallel-connected electricity storage system comprising:
an electricity-storage-element-voltage measuring device that measures an electricity storage element voltage of each of the electricity storage elements;
an electricity-storage-element-state estimating device that estimates an electricity storage element state of each of the electricity storage elements;
an electricity storage-element-current measuring device that measures an electricity storage element current of each of the electricity storage element rows;
a parallel-connected switch that performs connection and disconnection to and from the parallel-connected electricity storage system for each of the electricity storage element rows; and
a parallel-connected-switch control means for turning on the parallel-connected switch on the basis of the electricity storage element voltage, the electricity storage element state, and the electricity storage element current.

2. The parallel-connected electricity storage system according to claim 1, wherein the parallel-connected-switch control means turns on, at time of a electricity storage element row open-circuit voltage difference when an equal current flows to the electricity storage element rows, the parallel-connected switch of the electricity storage element row not connected to the parallel-connected electricity storage system.

3. The parallel-connected electricity storage system according to claim 2, wherein, when the electricity storage element row open-circuit voltage difference is represented as ΔOCV, a current average after the parallel-connected switch of the electricity storage element row not connected to the parallel-connected electricity storage system is turned on is represented as Iavg(n), a number of electricity storage element rows is represented as n, series resistance of the electricity storage element row not connected to the parallel-connected electricity storage system is represented as R0(:, 1), a series resistance average of the electricity storage element row connected to the parallel-connected electricity storage system is represented as R0avg, and a polarization resistance average of the electricity storage element row connected to the parallel-connected electricity storage system is represented as Ravg, an expression described below is satisfied $$\Delta OCV = Iavg(n) \times (R0avg + Ravg - R0(:,1)).$$

4. The parallel-connected electricity storage system according to claim 3, wherein, when a sum of the electricity storage element row currents immediately before the parallel-connected switch of the electricity storage element row not connected to the parallel-connected electricity storage system is turned on is represented as I, the current average Iavg(n) satisfies an expression described below $$Iavg(n) = I/n.$$

* * * * *